Sept. 15, 1953 H. A. ROBINSON 2,652,489

DISCRIMINATOR CIRCUITS

Filed June 24, 1949

INVENTOR
Harris A. Robinson
BY Harry Tunick
ATTORNEY

Patented Sept. 15, 1953

2,652,489

UNITED STATES PATENT OFFICE 2,652,489

DISCRIMINATOR CIRCUITS

Harris Alexander Robinson, Philadelphia, Pa., assignor to Radio Corporation of America, a corporation of Delaware Application June 24, 1949, Serial No. 101,079

2 Claims. (Cl. 250—27)

This invention relates to discriminator circuits, and more particularly to discriminator circuits capable of being tuned to shift the response curves thereof over a rather extensive frequency range.

An object of this invention is to simplify the design of tunable discriminator circuits.

Another object is to provide a discriminator circuit which utilizes only a single tuned circuit.

A further object is to devise a tunable discriminator which requires only a single tunable circuit, thus enabling tuning of such discriminator by means of a single control.

A still further object is to provide a discriminator having a single-ended tuned circuit one end of which is grounded, and which, therefore, does not require any special provisions for balancing the same with respect to ground when the same is tuned to shift the response curve of the discriminator with respect to frequency.

Figure 1:
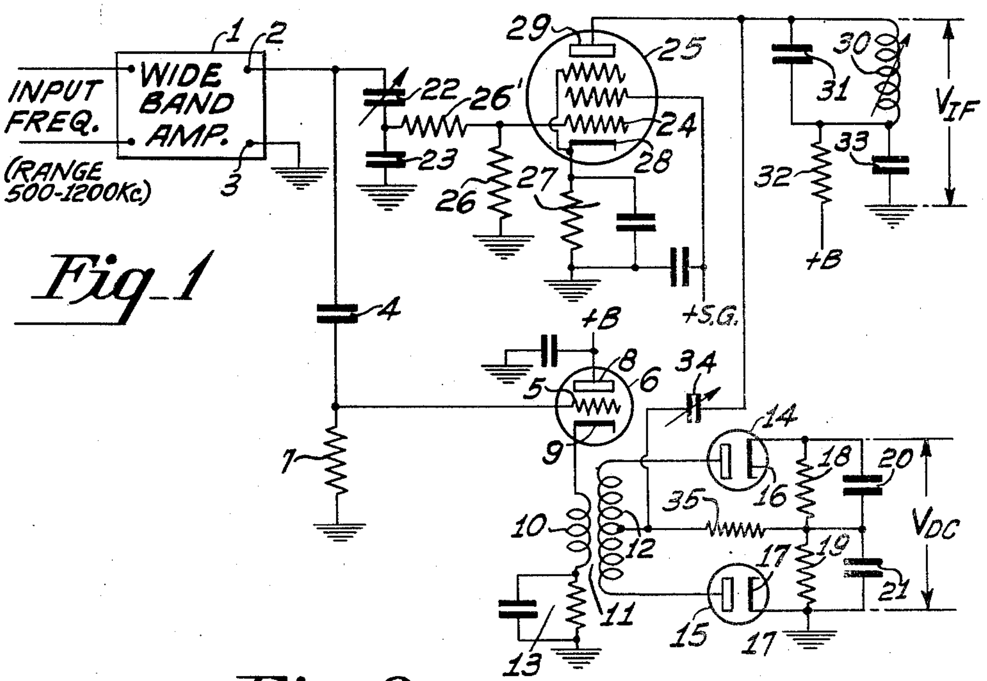
Figure 2:
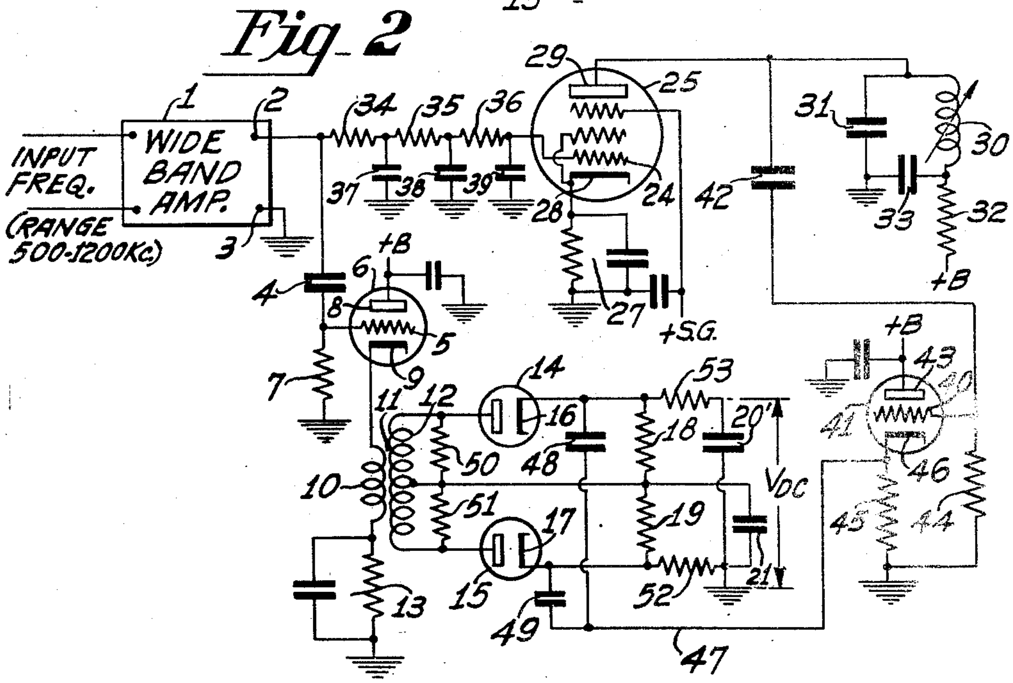

The foregoing and other objects of the invention will be best understood from the following description of some exemplifications thereof, reference being had to the accompanying drawings, wherein:

Fig. 1 is a diagrammatic respresentation of a discriminator according to this invention; and Fig. 2 is a diagrammatic representation of a modification.

The objects of this invention are accomplished, briefly, in the following manner:

A cathode follower coupling stage employing an untuned or wide band coupling transformer introduces the fixed phase component of voltage into a phase discriminator circuit. The component of voltage whose phase varies with the deviation of the input frequency from a predetermined resonant frequency is introduced into the discriminator from a single-ended parallel tuned circuit by way of a pair of fixed phase-shifting elements. By simply changing the resonant frequency of the parallel tuned circuit, the cross over point of the discriminator response curve or characteristic can be shifted over an extensive frequency range.

Now referring to Fig. 1, an input signal frequency, which may vary selectively over a rather wide frequency range, such as from 500 to 1,200 kilocycles for example, is applied to the input side of a wide band amplifier 1 which has a pair of output terminals 2 and 3, terminal 3 being grounded. Terminal 2 is preferably coupled to the anode of the final tube stage in amplifier 1, while terminal 3 is coupled to the cathode of such stage and to ground. Terminal 2 is coupled by coupling condenser 4 to the control grid 5 of a tube 6, a suitable grid leak resistor 7 being connected between such grid and ground. The anode 8 of triode 6 is connected to a source of positive potential, a suitable by-pass condenser being provided between such anode and ground.

Tube 6 provides a cathode follower coupling stage, and to effect this function the cathode 9 of such tube is connected in series with the primary winding 10 of an untuned coupling transformer 11 having a secondary winding 12. The end of winding 10 remote from cathode 9 is connected to ground through a cathode resistor and condenser unit 13 to complete a biasing circuit for grid 5 through resistor 7. Opposite ends of secondary winding 12 are connected to feed corresponding electrodes of diode rectifiers 14 and 15, these corresponding electrodes being the anodes of such rectifiers as shown. The cathodes 16 and 17 of diodes 14 and 15 are connected together by two series-connected load resistors 18 and 19. Resistor 18 is shunted by capacitor 20 and resistor 19 is shunted by capacitor 21, these capacitors by-passing any intermediate frequency energy appearing in the output of the detectors and also determining the time constants of the circuits so that the potentials developed thereacross follow only slow changes in the amplitude of the I. F. out of the amplifier 1. The cathode end of resistor 19 is grounded so that the voltage $V_{DC}$ at the upper ungrounded end of resistor 18 varies plus to minus and vice versa as the input frequency shifts through the cross over point of the discriminator characteristic, as will hereinafter appear.

The transformer 11, the primary and secondary of which are both untuned, acts as a wide band coupling transformer the response of which, in operation, is of a phase which is substantially fixed or unvarying as the input frequency to the discriminator changes. The cathode follower stage including tube 6 has a low output impedance, so that the use of such a stage to couple the voltage component of fixed phase into the discriminator enables this portion of the circuit to respond rather uniformly over a broad band of input frequencies.

Output terminal 2 is also coupled through a capacitive voltage divider, consisting of a pair of series-connected capacitors 22 and 23 between terminal 2 and ground, to the control grid 24 of a class A amplifier stage tube 25, a resistor 26' being included in series in this grid coupling in order to suppress spurious frequencies or parasitics. Grid 24 is biased in a conventional manner by a grid resistor 26 connecting the grid to ground and a cathode resistor and condenser unit 27 connecting the cathode 28 of tube 25 to ground. The screen grid of pentode 25 is connected to a suitable positive potential source and is by-passed to ground in the usual manner. The anode 29 of tube 25 is coupled to a parallel tuned circuit comprising a variable inductance 30 and a capacitor 31, the source of anode potential being connected to said anode through a resistor 32 which is connected to the end of inductance 30 remote from said anode. The lower sides of inductance 30 and of capacitor 31 are grounded for radio frequencies by capacitor 33, so that in effect the parallel resonant circuit 30, 31 constitutes a single-ended tuned circuit having one end at equivalent ground potential.

The voltage developed across the tuned circuit 30, 31, which varies in phase as the applied input frequency deviates from the resonant frequency of such tuned circuit, is fed by capacitor 34 to the mid-point of the secondary winding 12 of the broad untuned coupling transformer 11. A resistor 35 connects this mid-point to the common connection of resistors 18 and 19 and of capacitors 20 and 21. The combination 34, 35 is a fixed phase-shifting network, in which condenser 34 has a low value of capacitance and resistor 35 has a low value of resistance, thereby to give a phase shift of approximately 90° to voltages passing through such network and being applied to the diode circuits through the load resistors 18 and 19 and the two halves of the secondary winding 12.

Due to the fact that the capacitance of condenser 34 is rather low, this condenser has a rather high impedance, so that during operation of the circuit there is a rather large voltage drop across such condenser. Therefore, in this embodiment it is desirable to use an amplifier between terminal 2 and the parallel tuned circuit 30, 31 and condenser 34, to insure that the voltage component applied to the discriminator circuit through the phase-shifting network will have sufficient magnitude for proper operation. The necessary amplification is provided by the amplifier stage including tube 25.

In operation, the wide band or broad untuned coupling transformer 11 has a response which is substantially uniform with frequency, so that for all frequencies the voltage component introduced or applied by such transformer to the diodes has a fixed phase which does not vary with frequency or as the input frequency varies. At the frequency to which the tuned circuit 30, 31 is tuned for any particular setting of the inductance value of element 30, such circuit in effect acts as a pure resistance, so that at this frequency the voltage across said tuned circuit is substantially in phase with the voltage across the winding 10 of the cathode follower. Actually, these voltages are substantially 180° out of phase, due to the phase reversal from input to output of tube 25, but insofar as their effect on the diode circuits is concerned, they are effectively in phase.

Due to the action of the 90° phase-shifting network 34, 35, the voltage across the tuned circuit 30, 31 will be shifted in phase by substantially 90° before being applied to the secondary winding 12, so that at the resonant frequency of said circuit the two voltages applied to the diodes (one of which is derived from winding 10 through inductive coupling and the other of which is derived from circuit 30, 31 through the phase-shifting network 34, 35) will be exactly 90° different in phase from each other, or will be exactly in phase quadrature. The net voltage of each of the two diodes is the resultant of the voltage fed cophasally to the diodes from circuit 30, 31 and the voltage fed antiphasally to the diodes from winding 10. Each of these resultant voltages is rectified in its corresponding diode, and the two resultant voltages are combined differentially in the load resistors 18 and 19 to produce a differential discriminator output voltage $V_{DC}$. At the resonant frequency of tuned circuit 30, 31 there is an exact phase quadrature relationship between the two voltages applied to each of the two diodes, as previously stated, so that the resultant voltage across the load resistor 18 of one diode is exactly equal to the resultant voltage across the load resistor 19 of the other diode, giving a net discriminator output voltage $V_{DC}$ of zero.

The tuned circuit 30, 31 is frequency-responsive, and has an action common to all tuned circuits of this type, which is that the voltage developed thereacross shifts in phase as the input frequency changes near the resonant frequency of such circuit, shifting in phase oppositely for input frequencies on opposite sides of such resonant frequency. This is due to the fact that, at one side or the other of the resonant frequency of the tuned circuit, the circuit no longer acts as a pure resistance (as it does at the resonant frequency), but acts as an inductive reactance on one side of the resonant frequency and as a capacitive reactance on the other side of the resonant frequency. This frequency-dependent phase-varying voltage is shifted in phase substantially 90° by network 34, 35, so that the voltage applied to the mid-point of winding 12 is substantially 90° different in phase from that across the tuned circuit 30, 31 for all frequencies and varies in phase, with respect to the voltage across winding 10, with such tuned circuit voltage. In other words, the voltage component applied to the mid-point of winding 12 varies in phase as the input frequency changes near the resonant frequency of circuit 30, 31; this component, therefore, varies in phase as the input frequency deviates from the resonant frequency of the tuned circuit 30, 31; it will be remembered that the component derived from winding 10 is of fixed phase.

As previously discussed, at the resonant frequency of tuned circuit 30, 31 there is an exact 90° or phase quadrature relationship between the two voltages applied to each diode. Since the voltage applied to the mid-point of winding 12 follows the phase changes of, or varies in phase with, the voltage across the tuned circuit 30, 31, and since the phase of the tuned circuit voltage varies oppositely for input frequencies on opposite sides of the tuned circuit's resonant frequency, the voltage applied to the mid-point of winding 12 will shift in phase from the normal phase quadrature relation relative to the voltage component derived from winding 10 as the input frequency varies from the resonant frequency of tuned circuit 30, 31, which resonant frequency may be termed the cross over point of the discriminator; these phase shifts as applied to either one of the diodes will be in opposite directions for input frequencies on opposite sides of the resonant frequency of the tuned circuit.

Assume that for an input frequency higher than the tuned circuit's resonant frequency, the phase-varying voltage component applied to diode 14 has a phase angle of less than 90° with respect to the fixed-phase component applied to this diode. At this input frequency the phase-varying voltage component applied to diode 15 has a phase angle of more than 90° with respect to the fixed-phase component applied to this diode. Under these conditions, the two resultant voltages appearing in the corresponding load resistors are unequal, giving a finite net discriminator output voltage $V_{DC}$ greater than zero; this voltage at the upper ungrounded end of resistor 18 may be either positive or negative with respect to ground, depending upon the connections.

For an input frequency lower than the resonant frequency of the tuned circuit, the phase-varying voltage component applied to diode 14 would have a phase angle of more than 90° with respect to the fixed-phase component applied to this diode, while the phase-varying voltage component applied to diode 15 would have a phase angle of less than 90° with respect to the fixed-phase component applied to this diode. Here, again, the two resultant voltages appearing in the corresponding load resistors would be unequal, giving a finite net discriminator output voltage $V_{DC}$ greater than zero, this voltage at the ungrounded end of resistor 18 being either negative or positive with respect to ground, depending on the connections, and for any chosen connections being opposite in polarity to the voltage $V_{DC}$ developed when the input frequency is higher than the resonant frequency of the tuned circuit. Since at the resonant frequency the fixed-phase component and the varying-phase component are in phase quadrature, the operation of the discriminator of this invention is in some respects similar to that disclosed in Seeley Patent 2,121,103.

Thus, a point on series resistors 18, 19 being grounded, the voltage $V_{DC}$ at the ungrounded end varies plus to minus and vice versa as the frequency shifts through the resonant frequency of the tuned circuit or the cross over point of the discriminator characteristic. In accordance with the above action, the discriminator circuit of this invention has an S-shaped output-versus-frequency characteristic that is typical of discriminators of this type, the zero-output or cross over point of the characteristic being located at the resonant frequency of the tuned circuit 30, 31. The direct voltage $V_{DC}$ developed at the discriminator output may be utilized for any desired purpose, such as for controlling automatically the tuning of a receiver, as disclosed in my copending application, Serial No. 14,666, filed March 13, 1948, now Patent 2,568,412, dated September 18, 1951.

It may be seen, from the above, that the resonant frequency of the parallel tuned circuit 30, 31 determines and establishes the cross over point of the frequency discriminator characteristic. Therefore, by varying the inductance 30 and/or the capacitor 31 to change or vary the resonant frequency of the tuned circuit, the cross over point of the frequency-versus-output discriminator characteristic can be varied or shifted through a rather large or extensive frequency range. In a discriminator of this invention which was actually built and tested, it was found that a frequency range of 2:1 could be easily obtained.

According to my copending application, the input frequency to amplifier 1 may be set at some desired value in a range of 500 to 1,200 kilocycles, for example, and simultaneously with the setting, the tuning of circuit 30, 31 is varied or adjusted to establish the cross over point of the frequency discriminator at such desired value. A discriminator output voltage $V_{DC}$ is developed at the upper end of resistor 18 for tuning purposes, and tuning takes place as long as a potential of appreciable magnitude is developed at this point. Once the original tuning has been effected, the discriminator output voltage may thereafter be used for AFC purposes, since only when the input frequency to the discriminator falls at the cross over point of the discriminator characteristic is the voltage $V_{DC}$ zero.

The damping or Q of the tuned circuit 30, 31 determines the width or slope of the discriminator characteristic. The lower the Q or the greater the damping of this circuit, the wider is the discriminator characteristic, or the less is the slope of such characteristic.

It may be seen that the tunable discriminator of this invention is of rather simple design, in that only a single tuned circuit 30, 31 is utilized. Moreover, one end of such tuned circuit is at equivalent ground potential. In phase discriminators of the prior art, there is generally more than one tuned circuit, and in addition, one or more of such circuits is ordinarily double-ended, so that, if such discriminators are to be made tunable, not only must provision be made for tuning the plurality of circuits simultaneously and in unison, but provision must also be made for maintaining one of such circuits balanced with respect to ground throughout the tuning range. It is very difficult, therefore, to tune such prior discriminators over an extensive frequency range. The circuit of this invention, on the other hand, since it has only one tuned circuit and since, moreover, such tuned circuit is single-ended with respect to ground, is relatively simply and easily tuned throughout a very wide frequency range.

The LC circuit 30, 31 also serves as a frequency selective coupling network for coupling the voltage $V_{IF}$ thereacross to a following stage for further utilization as desired of such voltage.

It has been found that, in practice, even with amplifier stage 25, an undesirably high amount of loading may be caused by the elements 34 and 35 of the fixed phase-shifting network. This loading may take place particularly at higher frequencies and may unduly widen the discriminator characteristic, thus causing the discriminator to be less selective. These disadvantages may be obviated by the modified circuit of Fig. 2, in which elements the same as those of Fig. 1 are denoted by the same reference numerals.

Now referring to Fig. 2, a plurality of series resistors 34, 35 and 36 and shunt capacitors 37, 38 and 39 are connected in the grid or input circuit of tube 25 between the control grid 24 thereof and output terminal 2 of wide band amplifier 1. The RC network 34—39 serves as a fixed phase-shifting network in the grid circuit of tube 25, and such network produces a phase shift of approximately 90° in the output voltage of amplifier 1, between the output terminal 2 thereof and grid 24. Therefore, one important difference between the circuits of Figs. 1 and 2 is that in Fig. 2 the 90° phase-shifting network is connected in the input circuit of tube 25, rather than in the output circuit thereof, as in Fig. 1.

A slight difference in the tuned circuit of Fig. 2, as compared with Fig. 1, is that the lower plate of condenser 31 in Fig. 2 is connected directly to ground, the lower end of inductance 30 being connected to ground through capacitor 33 as in Fig. 1. However, in Fig. 2 the tuned circuit 30, 31 is again single-ended and has one end at equivalent ground potential.

The control grid 40 of a cathode follower stage tube 41, which tube may in practice be one-half of a twin triode tube the other half of which is tube 6, is coupled to the output circuit of tube 25 and to the tuned circuit 30, 31 through a coupling condenser 42. The anode 43 of tube 41 is connected to a source of positive plate potential. A resistor 44 having a rather high value of resistance, such as one megohm for example, is connected between grid 40 and ground, this resistance being high in order to avoid appreciable loading of the output of tube 25 and appreciable loading on the voltage developed across tuned circuit 30, 31. This inappreciable loading of the output of tube 25 is also accomplished in part by the use of a cathode follower stage 41 in such output, a cathode follower stage having a low effective input capacitance and therefore a high input impedance. The cathode follower stage 41 is in effect connected between the tuned circuit 30, 31 and the discriminator circuit, to supply the phase-varying voltage component to such discriminator.

A cathode resistor 45 is connected between the cathode 46 of tube 41 and ground, and the voltage output is taken from across this resistor by means of a split lead 47 which is connected to the cathode end of such resistor and the opposite ends of which are connected to the respective discriminator diode cathodes 16 and 17 through respective coupling condensers 48 and 49. Separate resistors 50 and 51 are connected across the two halves of secondary winding 12. An isolating resistor 52 is connected between diode cathode 17 and ground, while a series RC combination 53, 20′ is connected between the upper end of load resistor 18 and ground. Capacitor 21 is connected between the upper end of load resistor 19 and ground, as in Fig. 1.

Although in Fig. 2 the variable-phase voltage component is applied to the discriminator diodes in slightly different fashion than it is in Fig. 1, the operation of the Fig. 2 circuit is substantially the same as that of the Fig. 1 circuit, since in Fig. 2 such component is again applied cophasally to the diodes. In Fig. 2, the necessary phase quadrature relationship (at the cross over point or at the resonant frequency of tuned circuit 30, 31) between the fixed-phase and varying-phase components applied to the diodes is provided by the action of the phase-shifting network 34—39, there being no appreciable phase shift (other than the 180° phase shift, previously discussed, between the input and output voltages of tube 25, but which may be disregarded) between the voltage on control grid 24 and the voltage applied through condensers 48 and 49 to the discriminator diodes. In fact, the circuit elements between control grid 24 and the diodes, including the cathode follower stage 41, are so designed as to produce an inconsequential or inappreciable phase shift. The circuit of Fig. 2 operates to provide an output voltage $V_{DC}$ across capacitor 20′ which varies plus to minus and vice versa with respect to ground as the input frequency shifts through the cross over point of the discriminator characteristic or through the resonant frequency of tuned circuit 30, 31.

In Fig. 2, the phase-shifting network 34—39 is in the grid circuit of tube 25, so that no loading of the output of such tube is produced by the elements of such network. At the same time, the cathode follower stage 41 which is in the output of tube 25 does not load such output appreciably, due to its high input impedance, this impedance being made high, also, by the high value of resistance of resistor 44. Therefore, particularly at higher frequencies, the discriminator characteristic of the Fig. 2 circuit may be somewhat narrower or more selective than the corresponding characteristic of the Fig. 1 circuit.

I claim:

1. In a frequency variation response network, an aperiodic wide band coupling transformer having its primary winding connected to a source of alternating potential of predetermined mean frequency, a resonant circuit connected to said source and having one end thereof at equivalent ground potential, said circuit being resonant at said mean frequency, a pair of diodes having corresponding electrodes connected one to each respective end of the secondary winding of said transformer, a pair of load resistors connected in series between the remaining electrodes of said diodes, means connecting one of said remaining electrodes to ground through a connection devoid of concentrated impedance, a resistor connected between the common junction of said pair of resistors and the mid-point of said secondary winding, and a capacitor connected between the mid-point of said secondary winding and the high alternating potential end of said resonant circuit, said resistor and said capacitor together constituting a 90° phase-shifting network.

2. In a frequency variation response network, a cathode follower amplifier stage, means connecting the input of said stage to a source of alternating potential of predetermined mean frequency, an aperiodic wide band coupling transformer having its primary winding connected to the cathode of said stage, a resonant circuit connected to said source and having one end thereof at equivalent ground potential, said circuit being resonant at said mean frequency, a pair of diodes having corresponding electrodes connected one to each respective end of the secondary winding of said transformer, a pair of load resistors connected in series between the remaining electrodes of said diodes, means connecting one of said remaining electrodes to ground through a connection devoid of concentrated impedance, a resistor connected between the common junction of said pair of resistors and the mid-point of said secondary winding, and a capacitor connected between the mid-point of said secondary winding and the high alternating potential end of said resonant circuit, said resistor and said capacitor together constituting a 90° phase-shifting network.

HARRIS ALEXANDER ROBINSON.

References Cited in the file of this patent

UNITED STATES PATENTS

| Number | Name | Date |
|---|---|---|
| 2,231,996 | Guanella | Feb. 18, 1941 |
| 2,259,891 | Hunt | Oct. 21, 1941 |
| 2,415,468 | Webb | Feb. 11, 1947 |
| 2,585,532 | Briggs | Feb. 12, 1952 |